United States Patent
Scherer et al.

(10) Patent No.: US 11,802,212 B2
(45) Date of Patent: Oct. 31, 2023

(54) METHOD FOR PRODUCING PIGMENT FRAGMENTS WITH A PREDEFINED INTERNAL AND/OR EXTERNAL CONTOUR USING A CRACK-FORMING LAYER, AND PIGMENT FRAGMENTS

(71) Applicant: GIESECKE+DEVRIENT CURRENCY TECHNOLOGY GMBH, Munich (DE)

(72) Inventors: Maik Rudolf Johann Scherer, Grainau (DE); Kai Herrmann Scherer, Grainau (DE); Raphael Dehmel, Neubeuern (DE); Christoph Hunger, Hausham (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 727 days.

(21) Appl. No.: 16/649,188

(22) PCT Filed: Jun. 5, 2018

(86) PCT No.: PCT/EP2018/000290
§ 371 (c)(1),
(2) Date: Mar. 20, 2020

(87) PCT Pub. No.: WO2019/057322
PCT Pub. Date: Mar. 28, 2019

(65) Prior Publication Data
US 2020/0291238 A1    Sep. 17, 2020

(30) Foreign Application Priority Data
Sep. 21, 2017  (DE) .................... 10 2017 008 831.4

(51) Int. Cl.
*B42D 25/378* (2014.01)
*C09C 3/04* (2006.01)
(Continued)

(52) U.S. Cl.
CPC ................. *C09C 3/04* (2013.01); *B31F 1/07* (2013.01); *B32B 43/006* (2013.01);
(Continued)

(58) Field of Classification Search
CPC ..... B42D 25/378; B42D 25/40; B42D 25/425
(Continued)

(56) References Cited

U.S. PATENT DOCUMENTS 6,410,130 B1   6/2002  Schuhmacher et al.
6,643,001 B1   11/2003 Faris
(Continued)

FOREIGN PATENT DOCUMENTS

CN      1900178 A     1/2007
CN    101452658 A     6/2009
(Continued)

OTHER PUBLICATIONS

International Search Report and Written Opinion from PCT Application No. PCT/EP2018/000290, dated Oct. 9, 2018.
(Continued)

*Primary Examiner* — Jamara A Franklin
(74) *Attorney, Agent, or Firm* — WORKMAN NYDEGGER

(57) ABSTRACT

A method for producing pigments comprises the steps of creating a first layer on a substrate, structuring the first layer and detaching the pigments from the substrate. In the present case, the first layer is a crack-forming layer, so that the first (Continued)

layer is structured by the arising of cracks. Prior to detaching the pigments, a pigment layer is applied onto the first layer structured by the cracks.

14 Claims, 4 Drawing Sheets

(51) Int. Cl.
| | | |
|---|---|---|
| *C09D 11/037* | (2014.01) | |
| *B31F 1/07* | (2006.01) | |
| *B32B 43/00* | (2006.01) | |
| *B42D 25/40* | (2014.01) | |
| *B42D 25/425* | (2014.01) | |
| *B42D 25/369* | (2014.01) | |
| *B42D 25/373* | (2014.01) | |
| *B44C 1/22* | (2006.01) | |
| *B44C 1/24* | (2006.01) | |
| *B32B 27/10* | (2006.01) | |

(52) U.S. Cl.
CPC ........... *B42D 25/378* (2014.10); *B42D 25/40* (2014.10); *B42D 25/425* (2014.10); *C09D 11/037* (2013.01); *B31F 2201/00* (2013.01); *B32B 27/10* (2013.01); *B42D 25/369* (2014.10); *B42D 25/373* (2014.10); *B44C 1/227* (2013.01); *B44C 1/24* (2013.01); *Y10T 156/11* (2015.01)

(58) Field of Classification Search
USPC ........................................................ 235/487
See application file for complete search history.

(56) References Cited

U.S. PATENT DOCUMENTS

| | | |
|---|---|---|
| 6,747,073 B1 | 6/2004 | Pfaff et al. |
| 7,645,510 B2 | 1/2010 | Argoitia |
| 2004/0091681 A1 | 5/2004 | Hoffmann |
| 2005/0019575 A1 | 1/2005 | Jungnitz et al. |
| 2006/0035080 A1 | 2/2006 | Argoitia |
| 2013/0063826 A1 | 3/2013 | Hoffmuller et al. |
| 2018/0141370 A1 | 5/2018 | Schinabeck et al. |
| 2020/0283636 A1* | 9/2020 | Fuhse .................. B42D 25/425 |

FOREIGN PATENT DOCUMENTS

| | | |
|---|---|---|
| CN | 106609050 A | 5/2017 |
| DE | 19738369 A1 | 3/1999 |
| DE | 19901612 A1 | 7/2000 |
| DE | 102004032799 A1 | 2/2005 |
| DE | 102015006854 A1 | 12/2016 |
| EP | 0370701 A1 | 5/1990 |
| EP | 1741757 A1 | 1/2007 |
| EP | 1932679 A1 | 6/2008 |
| EP | 2062947 A1 | 5/2009 |
| EP | 2316892 A2 | 5/2011 |
| EP | 2402401 A1 | 1/2012 |
| WO | 02083430 A2 | 10/2002 |
| WO | 2005017048 A2 | 2/2005 |
| WO | 2009010377 A2 | 1/2009 |
| WO | 2011138039 A1 | 11/2011 |
| WO | 2014161667 A1 | 10/2014 |

OTHER PUBLICATIONS

German Search Report from German Application No. DE102017008831.4, dated Mar. 22, 2018.

* cited by examiner

METHOD FOR PRODUCING PIGMENT FRAGMENTS WITH A PREDEFINED INTERNAL AND/OR EXTERNAL CONTOUR USING A CRACK-FORMING LAYER, AND PIGMENT FRAGMENTS

BACKGROUND

The invention relates to a method for producing pigments and to corresponding pigments.

Data carriers such as value documents or identification documents, but also other objects of value, such as for example branded products, often are provided with effect pigments for their protection, which allow the data carrier to be authenticity-checked and which at the same time serve as a protection against unauthorized reproduction. Effect pigments can, for example, be integrated in the substrate of the data carrier or applied onto the substrate of the data carrier. Pigments with a specified outer contour are a known shape of such effect pigments.

Effect pigments can be produced, among other things, by coating a carrier material, the coating being subsequently detached from the carrier and ground into small fragments. These fragments can be dispersed as pigments in a binder and finally printed. Neither the shape of the pigments nor their size are precisely defined by the mode of production.

However, there are also known various methods for creating pigments having a specified outer contour.

For example, WO 2005/017048 A2 proposes embossing the carrier material according to the desired pigment contour and creating the coating on the embossed carrier material. The coating is taken off the carrier layer and broken into pigments that may have a diameter of 5 to 100 μm by grinding and sieving. Also in EP 2 062 947 A1, which proposes an improved embossing structure to specify the contour of the pigments, the layer taken off is broken into pigments.

In alternative solutions, the pigment layers are structured into pigments by lasering or etching.

The fragments of pigments having uniform outer contours that nevertheless still occur have to be sieved out, for example on the basis of their size.

SUMMARY

The invention is based on the object of providing a flexible but cost-effective production method for pigments, which in particular allows to create pigments with narrow pigment size distribution.

It is a basic idea of the present invention to use a crack-forming layer within the framework of the pigment production. In particular, the crack formation can be used here for structuring into the individual pigments.

In the method for producing pigments, a first layer is created on a substrate, the first layer is structured, and the pigments are detached from the substrate. In the present case, the first layer is a crack-forming layer, so that the first layer is structured by the arising of cracks. Prior to detaching the pigments from the substrate, a pigment layer is applied onto the first layer structured by the cracks.

Structuring the pigments by a later method step, e.g. by breaking the pigment layer during or after the detachment of the pigments from the substrate, is thus avoided. In the present case, the size distribution of the pigments produced is determined by the process of crack formation.

The pigments comprise at least the pigment layer and optionally also the first layer. The pigment layer itself may comprise several partial layers, such as for example one or more of the following partial layers: reflector layer, in particular metallic or highly refractive, dielectric, absorber layer, in particular metallic or highly refractive, liquid crystal layer, magnetic layer and/or embossing lacquer layer.

The pigment layer is structured into a plurality of pigment sections already by being applied to the structured first layer (and into the cracks).

The first layer is preferably adapted to the pigment layer. The thickness of the crack-forming layer is in particular greater than the thickness of the pigment layer. The width of the cracks to be formed is adapted so as to accommodate the pigment layer in the cracks.

The applied pigment layer rests in particular with pigment sections on pigment islands of the first layer and with pigment residues—in the cracks of the first layer—on the substrate.

The first layer forms the cracks autonomously, in particular within the framework of the solidification, such as drying or curing, of the first layer. The cracks thus arise in particular independently of the substrate. Properties of the (carrier) substrate, such as its bendability or the like, do not cause the crack formation. The volume of the first layer decreases upon solidification so that the cracks arise. The change in volume is also referred to as shrinkage. The first layer can be a layer with high shrinkage when drying. Alternatively, solidification (and thus shrinkage) is triggered by curing, in particular radiation curing, such as UV curing.

It is also advantageous that the crack formation already supports the step of detaching. Within the framework of crack formation, no ideally linear or smooth edges arise in the first layer. By the crack formation there arise pigment islands of the first layer, which have at least an undercut and/or an enlarged side wall area. The pigment islands have torn off side wall areas, which thus have an accordingly larger area than a linear side wall. The pigment islands additionally have undercut, in particular in the region of the side wall areas. They are therefore no longer connected to the substrate over the full area but are already partially detached from the substrate. The mechanical force theoretically required for the step of detaching is thus slightly reduced. More important is the advantage that thus, due to the larger surface and the undercut, a solvent can better dissolve the soluble layer. In particular, despite pigment residues in the cracks on the substrate, the solvent reaches the soluble partial layer thereof.

In the total area of the first layer, the cracks have an area proportion of at least 2%, preferably at least 3% and further preferably at least 5%, in particular the area proportion of the cracks is respectively below 15%, preferably respectively below 12%, further preferably respectively below 10%. The area proportion of the cracks can preferably be 2-15%, preferably 3-12% and further preferably 5-10%. The area proportion of the pigment islands is accordingly less than 98%, preferably less than 97% and further preferably less than 95%, in particular respectively over 85%, preferably over 88% and further preferably over 90%. Normally, the cracks have a width of more than 100 nm, preferably more than 200 nm, further preferably more than 500 nm.

The crack-forming layer can preferably be printed (in certain regions or over the full area). Other coating methods in certain regions or over the full area, such as doctoring, spraying, etc., can be used alternatively.

Preferably, the first layer and/or a method parameter is selected within the framework of crack formation such that pigments of a specified size are generated, i.e. in particular with sizes within a target size distribution.

In order to support the formation of certain pigment shapes, the first layer can be applied in certain regions, in particular stripwise, rectangular or square, and/or nucleus points can be provided for the crack formation. One can create nucleus points for the crack formation in particular in the form of partial recessions. The nucleus points are thus smaller (in depth and length) than the arising cracks. The nucleus points can be present in the substrate or in the first layer. They are configured and mutually arranged such that the shape of the pigments is determined by the nucleus points. Alternatively, or additionally, the first layer is applied in several regions, such as stripes, rectangles or squares, so that in each region a plurality of pigments are generated. The shape of the application region determines (by the crack formation beginning at the edge of the region) the shape of the pigments, e.g. stripwise or rectangular (or square) region=>rectangular (or square) pigments.

In first configurations for the step of detaching the pigments from the substrate, a soluble layer is dissolved. The pigment layer (and the first layer) is already structured into pigments (or in pigment sections of the pigment layer and pigment islands of the first layer), so that the pigments are detached from the substrate without mechanical stress, i.e. formation of further fragments. A partial layer of the substrate on which the first layer lies can be dissolved. As partial layer a soluble lacquer layer can be advantageously used. Alternatively, the first layer itself is dissolved.

The soluble layer is particularly preferably water-soluble. Other solvents, such as organic solvents, could be alternatively used. However, organic solvents are more expensive and often not compatible with all (conceivable or used) pigment layers (or partial layers).

In second configurations of the step of detaching, an intermediate substrate is used to lift off the pigments from the substrate and thereby detach them. The intermediate substrate stabilizes the pigments against mechanical stress during detachment. The pigment layer is brought into contact with an intermediate substrate so that the already structured pigment layer adheres in sections to the intermediate substrate. A suitable adhesive layer may have been applied to a carrier layer of the intermediate substrate or to the pigment layer. The adhesive layer, in turn, should be soluble, in particular water-soluble. By separating the intermediate substrate from the substrate, the pigments are separated from the substrate.

An intermediate product for producing pigments, in particular according to any of the procedures described above, comprises a substrate, a first layer and a pigment layer. On the substrate, the first layer is arranged which as a crack-forming layer has formed cracks. The pigment layer is arranged on the first layer structured by the cracks and thus structured into a plurality of pigments detachable from the substrate.

By the present method pigments with sizes of a specified size distribution can be produced without any intermediate steps.

The intermediate substrate comprises at least one intermediate substrate layer. Normally, the intermediate substrate comprises the intermediate substrate layer and an adhesive layer. The adhesive layer of the intermediate substrate is configured such that the pigment layer adheres more strongly to the adhesive layer of the intermediate substrate than to the substrate. The adhesive layer is a soluble, in particular water-soluble layer.

The pigments which have arisen from the pigment layer can be referred to as areal pigments or platelike pigments.

Of course, (the) pigments are provided for printing the pigments. The pigments, in particular those detached from the starting and/or the intermediate substrate, are processed into a printing ink. A printing ink having the pigments is printed. Preferably, the printing is effected by screen printing, in particular by means of zonal doctoring. Alternatively, the pigment can be printed by means of gravure printing and optionally by flexographic printing. The printing ink comprises the pigments and at least one solvent and optionally a binder. If the generated pigments have in particular a pigment size of less than 15 µm, preferably less than 10 µm, the printing ink can be used in an offset printing method.

The (effect) pigment can be provided for securing data carriers, such as value or identity documents, but also other objects of value, such as branded goods. The (effect) pigments allow a check of the authenticity and at the same time serve as protection against unauthorized reproduction. The (effect) pigments can, for example, be integrated into a substrate or applied, in particular printed, onto a substrate.

The pigment has a size or lateral extent of less than 200 µm, in particular less than 60 µm, preferably less than 30 µm. It is forseeable that pigments having sizes between 1 µm to 200 µm, preferably between 10 µm and 100 µm, particularly preferably between 20 µm and 60 µm, are possible. The thickness of the pigments is in the region of 30 nm to 4 µm (or up to 2 µm), preferably between 100 nm and 1µm.

As an optical effect layer of the pigment, a metal layer can be used, for example from aluminium, chrome, copper, iron, nickel, cobalt, silver, gold or from alloys of the aforementioned metals. The thickness of the metal layer is between 2 nm and 200 nm, preferably between 10 nm and 50 nm, particularly preferably between 15 nm and 30 nm.

The optical effect layer can be configured as a reflective or semitransparent layer, here instead of a metal layer a high-refractive layer (HRI layer) can be used. The pigment comprises preferably a three-layer construction which may be designed as a color-shifting and/or color-filtering construction. The pigment can be formed by the three-layer construction or comprise the three-layer construction as a supporting partial layer or as an optically active partial layer. The three-layer constructions preferably consist of a semi-transparent metal layer, a dielectric and a reflective (or semitransparent) metal layer. As dielectrics for example $SiO_2$, $ZnS$, $MgF_2$ or $TiO_2$ are used.

Particularly preferably, at least the optically active partial layers of the pigment are provided to be symmetric to the pigment plane. Thus, an orientation of the pigment after the printing process is irrelevant. For example, the pigment can be formed by two identical semitransparent partial layers with a supporting spacer layer. Such pigments have, preferably in a top view, a metallic gloss with a certain color spectrum, while in transmission they show a spectrum complementary to this color spectrum, particularly preferably gold in top view and blue in transmission. In another variant, a dielectric and a semitransparent layer are provided respectively symmetrically around a shared reflective layer (above and below).

For the pigments in their orientation being influenceable by a magnetic field, a magnetic layer can be used which can be formed for example from the metals iron, nickel, cobalt or from iron oxide, in particular magnetite ($Fe_3O_4$), or from alloys which include these metals. Such alloys preferably include further elements such as Si, Nd, B, Gd, Sm, Sr, Ba or Mn. Preferably, these are nickel-free magnetic alloys of Fe, Cr and/or Al, as used for example in EP2402402A1. The magnetic layer is advantageously located in the interior the pigments. In a particularly advantageous variant, the magnetic partial layer is provided between two reflective partial layers, for example made of aluminium. The pigments particularly preferably have a central magnetic layer which is provided on both sides (symmetrically) with a three-layer construction, i.e. in particular on both sides—from the inside to the outside—respectively comprises a reflecting layer (preferably a reflecting metallic layer), a spacer layer (preferably a dielectric layer) and an absorber layer (preferably a semitransparent metallic layer). The corresponding interference layer structure (on both sides) can alternatively be realized only by means of dielectric layers (such as TiO2 or SiO2).

BRIEF DESCRIPTION OF THE DRAWINGS

Further embodiment examples as well as advantages of the invention will be explained hereinafter with reference to the figures, in whose representation a rendition that is true to scale and to proportion has been dispensed with in order to increase the clearness.

There are shown.

DETAILED DESCRIPTION OF VARIOUS EMBODIMENTS

The production of pigments with narrow size distribution by means crack templates is hereinafter described using various examples.

A crack template here means a layer on a carrier foil (e.g. PET) that has a network of continuous cracks so that the entire layer ultimately consists of individual islands. This crack template is metallized, at the island edges the metallization tearing off due to the height difference and the island size thus determining the pigment size. The pigment layer is structured by the crack formation.

Figure 1A:
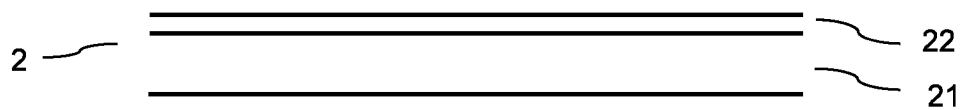
FIG. 1a-d layer structure at different times in the production of pigments by means of a crack-forming layer.
Figure 1B:
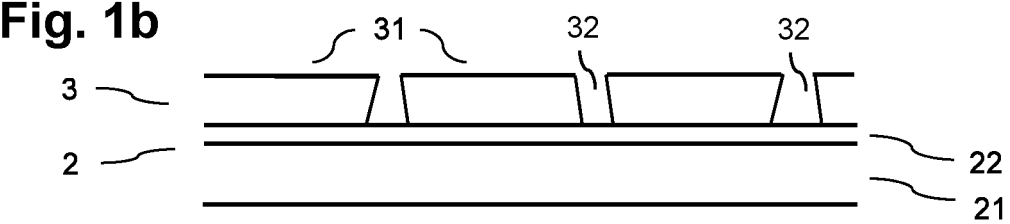

FIG. 1a shows a carrier foil 2 comprising a carrier layer 21 and an optional release layer 22. As shown in FIG. 1b, a continuous crack-forming layer 3 is applied to the carrier foil 2, in which cracks 32 form so that pigment islands 31 arise.

Figure 1C:
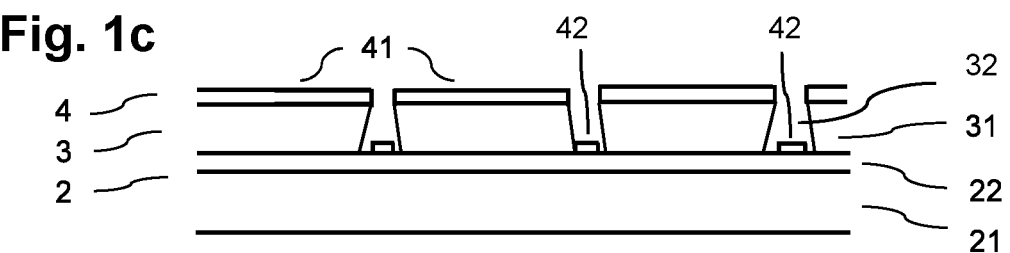

As shown in FIG. 1c, a pigment layer 4 is applied onto the crack-forming layer 3. The pigment layer 4 comprises pigment sections 41 located on the pigment islands 31. In addition, the pigment layer comprises pigment residues 42, which are arranged in the cracks 32, which lie on the carrier foil or its release layer 22. The pigment layer 4 can be or comprise a metallization. The pigment layer may comprise several partial layers, in particular symmetrical multilayer constructions. For example, the pigment may comprise as partial layers: one or more reflector partial layers, one or more dielectric partial layers, and one or more absorber partial layers, for example in a construction with absorber-dielectric-reflector, dielectric-absorber-dielectric, dielectric-reflector-dielectric, or absorber-dielectric-absorber.

In order to obtain the pigments, the crack template is either detachable from the foil (the crack template detaches from the foil but remains connected to the other pigment layers), or the crack template itself is water-soluble or soluble in another solvent so that, in the present case after the separation of the substrates, it dissolves and releases the pigment.

Thus, two pigment types can be produced:
pigments consisting of a first pigment partial layer, such as for example a vapor-deposited metallization, and of the crack-forming layer; or
pigments that consist only of the pigment layer, such as a vapor-deposited metal layer (without a crack-forming layer).

Figure 1D:
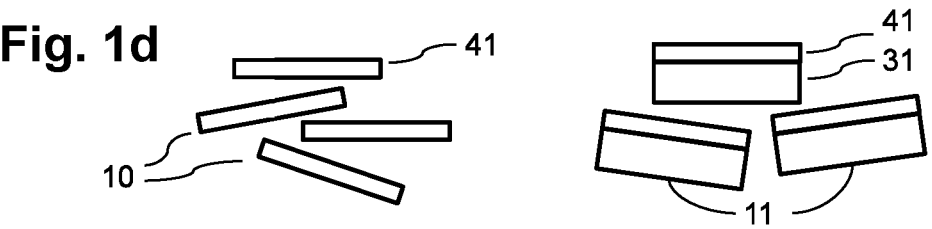

FIG. 1d shows a plurality of pigments 10, 11. The pigments 10 comprise only the pigment layer 4, i.e. where applicable, also the partial layers thereof. The pigments 11, on the other hand, comprise both the pigment layer 4 or the partial layers thereof and the crack-forming layer 3. The shape and size of the pigments 10, 11 correspond to the shape and size of the pigment islands 31 (or the pigment sections 41).

The crack-forming layer may contribute to the stability of the pigments or the crack-forming material may possess functional properties (e.g. fluorescent dyes or magnetic particles).

Different possibilities are known to produce the crack template.

In a first implementation, a dispersion applied over the full area of a carrier foil forms at a sufficiently high minimum film formation temperature (MFT>50° C.) cracks during physical drying. The dispersion consists of particles dispersed in water and of organic-polymer nature (e.g. based on polyacrylates, polystyrenes, etc.) or inorganic nature (e.g. SiO2, TiO2, Al2O3, etc.) or mixtures thereof. To ensure solubility of the crack template in water, water-soluble compounds can be added (e.g. sugar molecules, starch or polyethylene glycols etc.).

In another embodiment, a crack template is produced by means of the sol-gel technique. Here, alcoholates of metals and non-metals are employed, which under hydrolysis and condensation reactions form sol particles. Ultimately, they form a gel which in thin layers tends to crack formation during drying.

In another embodiment, a brittle UV lacquer with high shrinkage is applied all-over onto a carrier foil. During radiation curing, cracks form throughout due to shrinkage.

This crack template can, for example, be metallized to obtain the pigments. Ideally, the UV lacquer is designed such that it detaches by itself in water (water-soluble UV lacquers). For water-insoluble UV lacquers, a water-soluble intermediate layer is conceivable for detaching the pigments from the starting foil in water. On the carrier foil 2, then a corresponding release layer 22 is provided. The release layer 22 is soluble in a solvent, preferably in water as a solvent or alternatively in an organic solvent.

Figure 4:
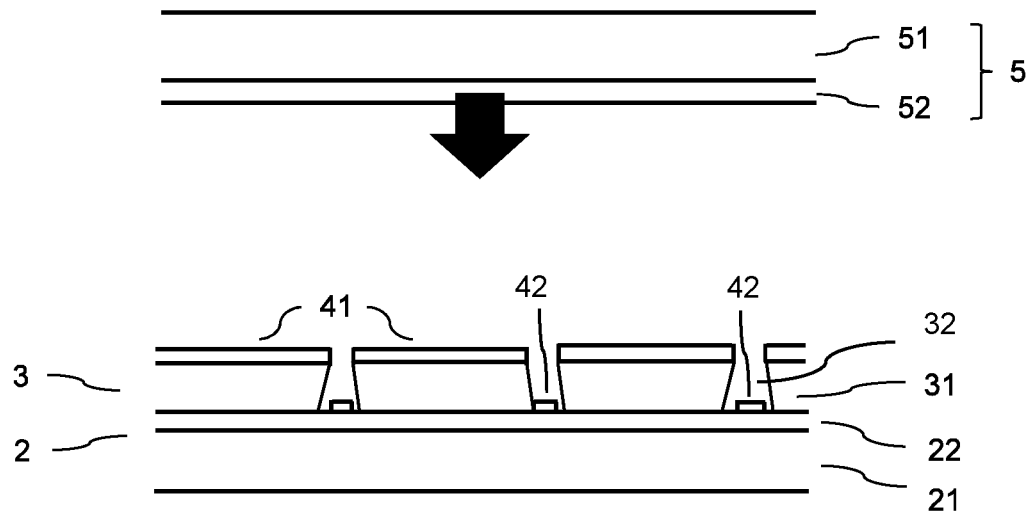
FIGS. 4 and 5 detaching the pigments from the substrate with the aid of an intermediate substrate.
Figure 5:
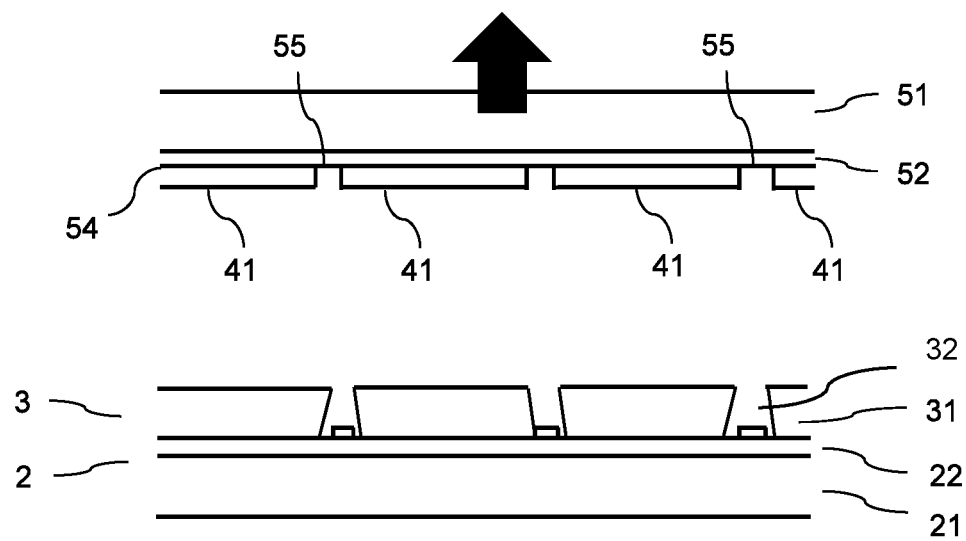

Likewise, a counter laminating foil with glue can detach the pigments from the carrier foil, the glue being subsequently dissolved and thus releasing the pigments. This variant will be described below in more detail with reference to FIGS. 4 and 5.

The control of crack formation is decisive for the size distribution and shape of the pigments and depends on the chosen production method of the crack template. In the case of physically drying dispersions, adjusting the island size (=pigment size) is effected via the known parameters such as minimum film formation temperature, layer thickness, particle size, additives or drying conditions.

Figure 2A:
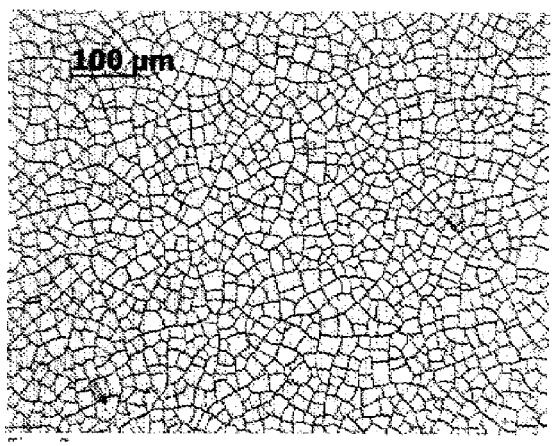
FIG. 2a, b two different examples of cracks in a crack-forming layer in a top view.

FIG. 2a shows an image of a crack template, where the cracks form islands of a size from a size region. The island size and thus the pigment size is <100 μm, in particular in the region of 10 to 30 μm (areas of 100 to 900 μm$^2$).

Figure 2B:
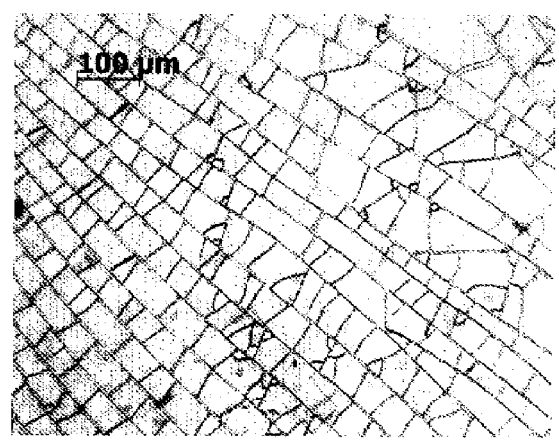

In addition, it is known that the first generation of cracks tears perpendicularly from the edge of the printed image inwards, whereupon the second generation of cracks now arises parallel to the edge of the printed image and thus between the first generation of cracks. The ladder-like crack template resulting therefrom leads to rectangular islands or pigments. FIG. 2b shows the image of a corresponding crack template having slightly larger islands. The pigment size here is also below 100 μm, but rather in the region of 20 to 60 μm (areas of 400 to 3600 μm$^2$).

However, this effect decreases with increasing distance from the edge of the printed image. If only rectangular islands are desired, the foil is printed in stripes.

Figure 3:
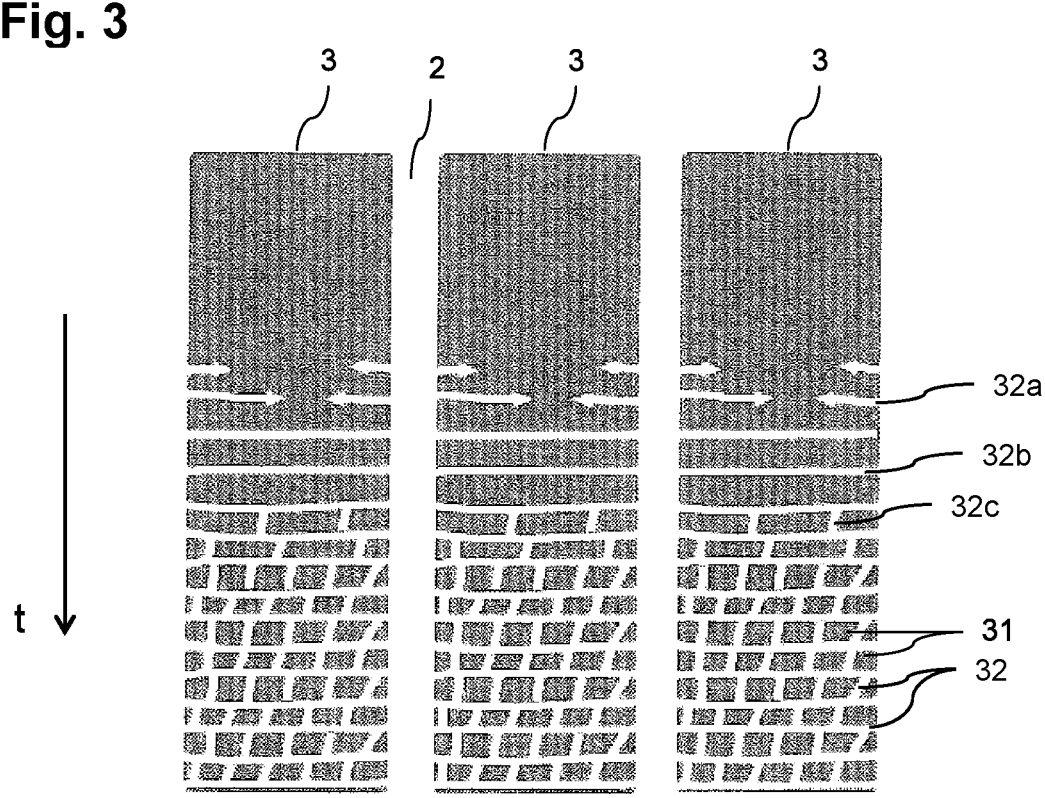
FIG. 3 time course of crack formation in a configuration with several stripes of the crack-forming layer.

FIG. 3 shows three stripes of a crack-forming layer 3 on the carrier 2. For illustration purposes, in the figure the phases of drying and crack formation are represented from top to bottom. The time arrow t symbolizes that a temporal course from top to bottom is represented here. The wet crack-forming layer 3 is still free of cracks. Upon drying, first cracks 32a arise from the edge of the stripe inwards. The cracks 32b of the first generation then extend from edge to edge across the stripe. Cracks 32c then arise parallel to the edge. The dry crack-forming layer comprises the almost rectangular pigment islands 31 and the cracks 32 arranged therebetween.

Hexagonal islands and thus pigments are also possible by other means.

For crack templates based on UV lacquers, a predetermined breaking point can be introduced during radiation curing by means of suitable structures on an embossing tool. The embossing tool presses e.g. two notches into or through the UV lacquer (cf. nanoimprinting), whereby after radiation curing a crack is initiated at the shortest distance between the two notches due to the shrinkage. By a certain arrangement of the notches the cracks can now be controlled in targeted fashion in lines and gratings.

Figure 6:
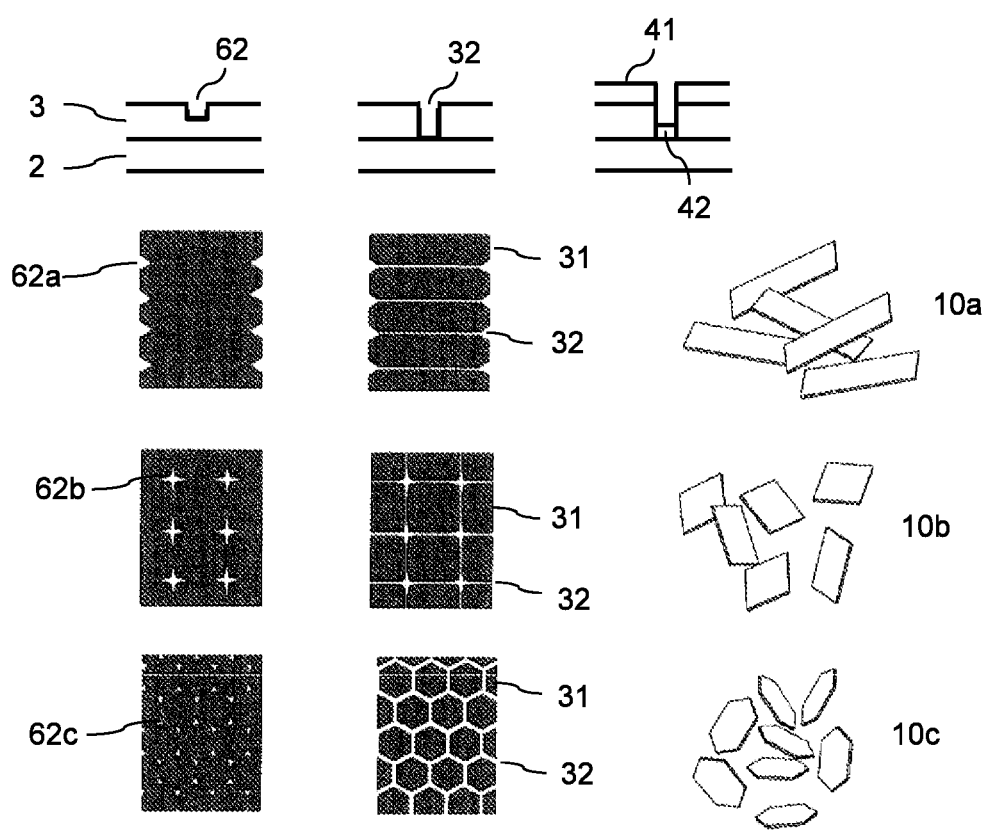
FIG. 6 use of nucleus points for the crack formation in the cross-section of the layer structure and for three different pigment shapes in a top view.

FIG. 6 in the top row shows a notch 62 in the crack-forming layer which is arranged on carrier substrate 2. The notch 62 serves only as a nucleus point for the crack formation and can therefore be smaller, in particular narrower and shorter, than the later crack 32. Likewise, it is sufficient when the notch 62 only partially extends into the crack-forming layer 3. The pigment layer is applied onto the crack-forming layer so that the pigment sections 41 arise.

Due to the variety of the arrangement of notches to each other and the type of the notches themselves, there is given a variety of shapes for the islands and therefore pigments.

In the second row of FIG. 6, triangular edge notches 62a are used to generate linear cracks 32 so that rectangular pigments 10a arise. The third row shows that by means of a corresponding arrangement of star-shaped notches 62b there can be produced square pigments 10b.

Of course, by this method there can also be produced hexagonal pigments 10c very easily by notches 62c generating cracks 32 at angles of 120° to each other, similar to a three-pointed star.

The pigment layer or one or more of the partial layers are in particular vapor-deposited, e.g. by means of PVD coating. In doing so, the previously described partial layers or sublayers of the partial layers are applied. Alternatively, a partial layer, in particular a metallic layer, could also be applied by gravure or flexographic printing method.

The substrate can also be reused for the present method, optionally after the residual sections have been detached from the substrate. On the substrate having relief structure, the first foil, crack-forming layer and pigment layer can be created several times in a row. Thus, material costs and process steps can be saved.

The invention claimed is:

1. A method for producing pigments, comprising the steps of:
   creating a first layer on a substrate;
   structuring the first layer; and
   detaching the pigments from the substrate;
   wherein the first layer is a crack-forming layer so that the first layer is structured by the arising of cracks; and
   prior to detaching the pigments, a pigment layer is applied onto the first layer structured by the cracks.

2. The method according to claim 1, wherein the pigments comprise:
   the pigment layer, or
   the pigment layer and the first layer.

3. The method according to claim 1, wherein the pigment layer is structured into a plurality of pigment sections by application to the structured first layer.

4. The method according to claim 1, wherein the applied pigment layer lies with pigment sections on pigment islands of the first layer and with pigment residues in the cracks on the substrate.

5. The method according to claim 1, wherein the first layer forms the cracks by itself, within the framework of a solidification of the first layer.

6. The method according to claim 1, wherein the first layer and/or a method parameter is adapted within the framework of the crack formation to generate pigments of specified size, with sizes within a target size distribution.

7. The method according to claim 1, wherein nucleus points for the crack formation are created in the form of partial recessions, in the substrate or the first layer, so that the shape of the pigments is determined by the nucleus points.

8. The method according to claim 1, wherein the first layer is applied in several stripes.

9. The method according to claim 1, wherein the pigment layer comprises several partial layers.

10. The method according to claim 1, wherein a soluble layer is dissolved in the step of detaching the pigments from the substrate.

11. The method according to claim 10, wherein the soluble layer is a partial layer of the substrate or the first layer.

12. The method according to claim 10, wherein the soluble layer is water-soluble.

13. The method according to claim 1, wherein the method comprises the further steps of:
   bringing into contact the pigment layer with an intermediate substrate,
   wherein the structured pigment layer adheres in sections to the intermediate substrate; and
   separating intermediate substrate and substrate, wherein the pigments are detached from the substrate by the step of separating.

14. The method according to claim 13, wherein at least the pigment layer adheres to a soluble layer of the intermediate substrate, which is arranged on a foil layer of the intermediate substrate.

* * * * *